United States Patent
Jonsson

(10) Patent No.: US 10,904,380 B2
(45) Date of Patent: Jan. 26, 2021

(54) METHOD FOR CONTROLLING NOTIFICATIONS FROM APPLICATIONS ON A USER DEVICE

(71) Applicant: Sony Corporation, Tokyo (JP)

(72) Inventor: Håkan Jonsson, Malmo (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/628,677

(22) PCT Filed: Aug. 11, 2017

(86) PCT No.: PCT/IB2017/054898
§ 371 (c)(1),
(2) Date: Jan. 5, 2020

(87) PCT Pub. No.: WO2019/030554
PCT Pub. Date: Feb. 14, 2019

(65) Prior Publication Data
US 2020/0220969 A1     Jul. 9, 2020

(51) Int. Cl.
*H04M 1/00*     (2006.01)
*H04M 1/725*     (2006.01)
*G06F 9/54*     (2006.01)

(52) U.S. Cl.
CPC ........ *H04M 1/72597* (2013.01); *G06F 9/542* (2013.01); *H04M 1/72586* (2013.01)

(58) Field of Classification Search
CPC ............................ G06F 9/542; H04M 1/72586
See application file for complete search history.

(56) References Cited

U.S. PATENT DOCUMENTS

| | | | | |
|---|---|---|---|---|
| 5,642,483 | A * | 6/1997 | Topper | G06F 9/542 700/46 |
| 7,120,913 | B2 * | 10/2006 | Kawase | G06F 9/52 718/107 |
| 7,177,859 | B2 * | 2/2007 | Pather | G06F 9/542 |
| 9,501,337 | B2 * | 11/2016 | Shapiro | G06F 9/542 |
| 9,678,850 | B1 * | 6/2017 | Rickard | G06F 11/3024 |
| 10,318,398 | B2 * | 6/2019 | Rickard | G06F 11/3093 |
| 10,754,752 | B2 * | 8/2020 | Rickard | G06F 11/3024 |
| 2004/0002972 | A1 * | 1/2004 | Pather | G06F 9/542 |

(Continued)

FOREIGN PATENT DOCUMENTS

EP     2 541 475 A1     1/2013

OTHER PUBLICATIONS

International Search Report and Written Opinion for corresponding Application No. PCT/IB2017/054898, dated May 28, 2018, 16 pages.

*Primary Examiner* — William D Cumming
(74) *Attorney, Agent, or Firm* — Tucker Ellis LLP

(57) ABSTRACT

A method for controlling notifications from applications on a user device includes setting a priority for each application on the user device based on a predetermined priority input, defining a notification limit, wherein the notification limit defines a total number of notifications for presenting notifications allowed during a time period available to applications on the user device, and providing each application with a portion of the total number of notifications allowed during the time period based on the set priority. A computer program product, a computer readable memory storage unit, and a computing arrangement or user device may also execute the method.

18 Claims, 4 Drawing Sheets

(56) References Cited

U.S. PATENT DOCUMENTS

| | | | |
|---|---|---|---|
| 2007/0156656 A1* | 7/2007 | Pather | G06F 9/542 |
| 2011/0060996 A1 | 3/2011 | Alberth | |
| 2011/0161987 A1* | 6/2011 | Huang | G06Q 10/10 |
| | | | 719/318 |
| 2013/0013720 A1* | 1/2013 | Huang | G06Q 10/10 |
| | | | 709/206 |
| 2014/0280657 A1 | 9/2014 | Miller | |
| 2014/0304714 A1* | 10/2014 | Shapiro | G06F 9/542 |
| | | | 719/318 |
| 2015/0288640 A1* | 10/2015 | Lee | G06Q 10/10 |
| | | | 709/206 |
| 2016/0014062 A1* | 1/2016 | Patel | H04L 67/32 |
| | | | 700/94 |
| 2016/0173700 A1 | 6/2016 | O'Connor | |
| 2017/0357562 A1* | 12/2017 | Rickard | G06F 11/3024 |
| 2019/0286538 A1* | 9/2019 | Rickard | G06F 11/3093 |
| 2020/0220969 A1* | 7/2020 | Jonsson | H04M 1/72586 |

\* cited by examiner

METHOD FOR CONTROLLING NOTIFICATIONS FROM APPLICATIONS ON A USER DEVICE

FIELD OF THE INVENTION

The present invention relates to a method for controlling notifications from applications on a user device. The invention further relates to a computer program product, a computer readable memory storage unit, and a computing arrangement or user device for executing the method.

BACKGROUND ART

Mobile phone users are overwhelmed with an abundance of notifications displayed on their mobile phone from multiple applications running on the phone. Managing notifications is very complex in terms of current setting designs regardless of operating system. Each app has its own settings, and some operating system versions allow you to manage it from its settings menus. Few users are advanced enough or are willing to put in the time and work load to adjust these settings. Potentially all applications installed on the mobile phone may be set to display notifications creating a massive overload of notifications for the user. This makes users ignore or turn off all notifications which often cause them to miss important notifications, especially communication notifications that may be potentially important.

Today the only way to control the flow is to turn off notifications entirely or for particular applications. Rule systems have been proposed e.g. in outlook. However, such systems are generally too complex and would not be suitable for most users.

There is thus a need for a need in the industry for an improved way of handling notifications from applications in mobile phones and other user devices.

SUMMARY OF THE INVENTION

It is an objective of the present invention to provide an improvement of the above technique and prior art. More particularly, it is an objective of this invention to provide an improved method for controlling notifications from applications on user devices.

According to a first aspect, these and other objects, and/or advantages that will be apparent from the following description of embodiments, are achieved, in full or at least in part, by a method for controlling notifications from applications on a user device. The method comprises setting a priority for each application on the user device based on a predetermined priority input, defining a notification limit, wherein the notification limit defines a total number of notifications for presenting notifications allowed during a time period available to applications on the user device, and providing each application with a portion of the total number of notifications allowed during the time period based on the set priority.

The method thus introduces a way of limiting the total number of notifications and prioritize between notifications from different applications so that the applications that are set to have the highest priority input is given the priority to show a notification if the total number of notifications does not allow all notifications from all applications to be shown.

The method may further comprise receiving a notification request from an application on the user device, allowing the notification request if the portion and the notification limit, respectively, is larger than one, and reducing the notification limit and portion, respectively, by one if the notification request is allowed. In that way it is ensured that the total number of notifications for presenting notifications allowed during a time period available to applications on the user device is not exceeded while introducing a consequence for applications of losing future possibilities of showing notifications after each presented notification.

The method may further comprise receiving a number of notification requests from at least one application on the user device, if the number of notification requests exceeds the notification limit, communicating a reply to each request that a number of requested notifications exceeds the notification limit, auctioning the limited number to the applications offering the largest resource portion per available notification. This opens the possibility for the applications to ration its given portion. A not very important notification from the application may e.g. be allowed by the application to use only a fraction of the total given portion available for the application, while a very important notification may be allowed to use a large part or all of the total portion of the application to give it the best chance to "win" the auction if competing with other applications over limited number of notifications.

The priority input and/or the notification limit may be altered based on the time of day. Time of day may e.g. affect the priority of the applications so that each application receives a lower priority at night when the user sleeps or at times out of predefined office hours. Also or alternatively the notification limit may be reduced at those times to reduce the number of notifications possible to receive.

The priority input and/or the notification limit may further be modified by at least one setting made by a user of the user device, the operational system of the user device, a network operator of the user device. The user may e.g. have a sliding control for setting the priority for all applications and/or for affecting the notification limit. The user may also affect the priority of single applications so as to reduce notifications from applications that the user find less important or annoying. The operational system may affect the priority of applications based on running applications at the moment. If, e.g. a telephone call is made or a video is shot, the operating system may make it more difficult for applications to show notifications by affecting the priority input of certain applications categories or for all applications or by reducing the resource limit.

The network operator may on the other hand also affect priority of certain applications to promote them or to limit notifications in emergencies.

The user device may be a device comprised in the group of: a mobile phone, a tablet computer, a laptop, and a stationary computer or any device comprising applications that are implemented to show notifications.

A notification request may further be allowed regardless of remaining notification limit of notifications if the priority is set above a predetermined threshold. That may e.g. be the case for messenger applications that are given a high priority to always show received messages as notifications.

A notification request may alternatively be allowed regardless of remaining notification limit of notifications if the offered resource portion is above a predetermined threshold. This is a different way of making sure that certain applications as e.g. message applications always are allowed to show notifications.

According to a second aspect the mentioned objects are achieved in full or at least in part by a computer program product comprising computer program code means comprising the described method for controlling notifications from applications on a user device.

According to a third aspect the mentioned objects are achieved in full or at least in part by a computer readable storage medium or memory storage unit comprising such a computer program.

According to a fourth aspect the mentioned objects are achieved in full or at least in part by a computing arrangement or user device comprising a calculation device or notification controller adapted to execute the mentioned computer program product or the mentioned computer readable storage medium or memory storage unit.

The technological view in the prior art has a very functional view of applications. They perform the tasks we command them to. However, this view is not completely correct. In view of the direct channel to users via notifications that applications have and in view the here presented method one could instead reason that applications are channels that companies are using to trigger buying behaviors, by presenting notification on our most personal devices as e.g. our mobile phones. This means that users could be in a position to charge for these notification, just like mobile phone vendors can for preloading phones.

Each notification may be given a price and the mentioned portion of total notifications allowed for a time period that is given to each application may be pre-loaded currency for each application. If an application needs to show a notification when the portion it has left is not enough for showing a notification or wining an auction, the application may pay extra to show the notification. The application provider, e.g. the company providing the application or the application store, will then be charged for the notification and the money will be credited to the user of the user device, to the network operator or the operating system provider.

A market place for notifications may thus be made possible where the applications may compete for the possibility to show notifications. The rules and prices of the market may be controlled by the user device owner, the operating system and/or the network provider.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1A:
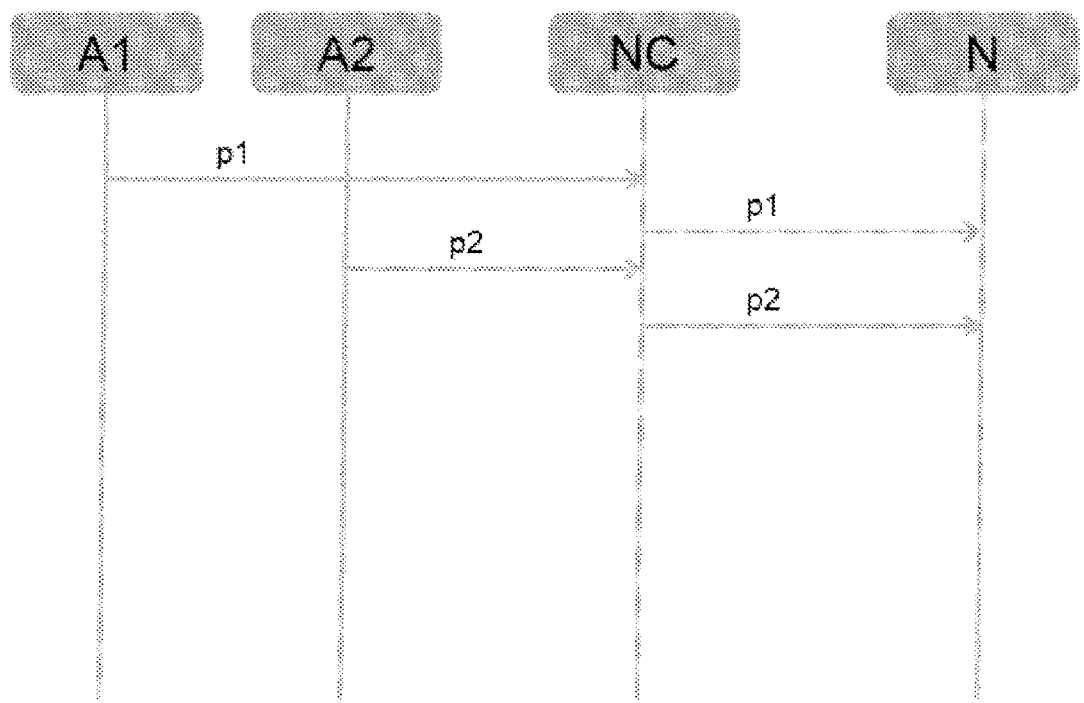
FIG. 1a is a schematic view of two applications showing notifications according to the prior art.

FIG. 1a is a schematic view of a first application A1 and a second application A2 of a user device showing notifications according to the prior art. Each of the first and second applications A1, A2, sends a notification p1, p2, to a notification controller NC that just relays the notifications p1, p2 to a notifyer N. The notifyer is in most devices a display for displaying a text or image notification. The notifyer may, however, also be a speaker or a LED of the user device. As is indicated in FIG. 1a, all notifications are displayed in order by the prior art solution.

Figure 1B:
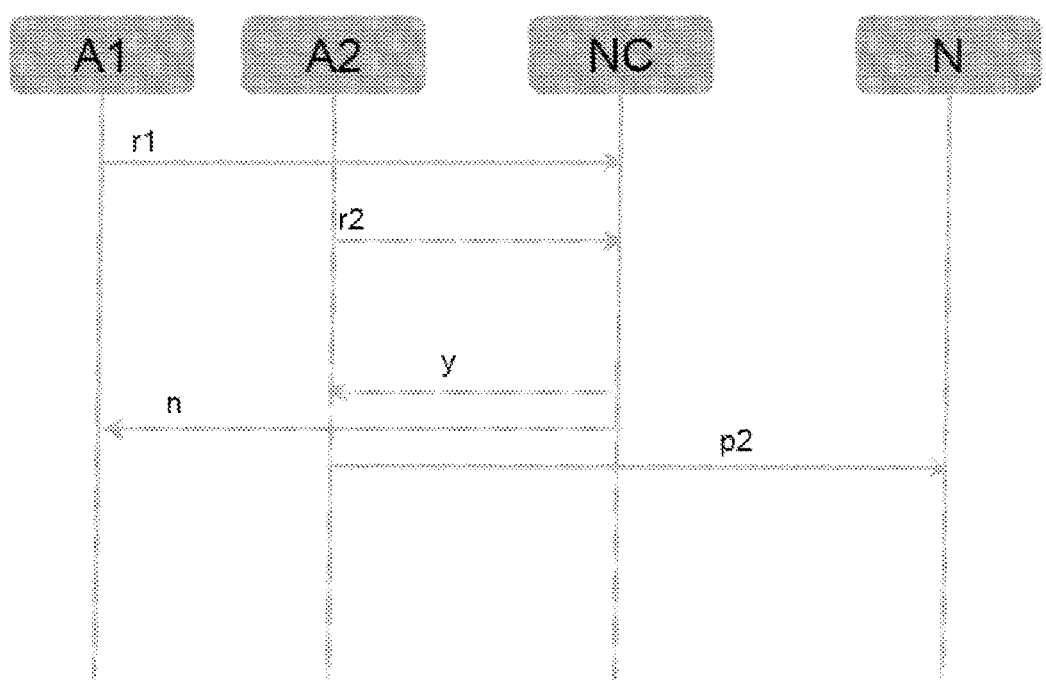
FIG. 1b is a schematic view of an auction between two applications.

FIG. 1b is a schematic view of a contest between two applications according to the herein presented method. The notification limit is in the shown situation reduced to a total number of one notification, i.e. only one notifcation may be shown at the time period. A first application A1 and a second application A2 of a user device (it may be the same applications as in the prior art shown in FIG. 1a), both send a notification request r1, r2, respectively, to a notification controller NC. The notification controller NC gives the request r2 from the second application A2 permission, but declines the request r1 from the first application A1. The second application A2 then sends its notification p2 to the notifyer N (display, LED, speaker etc) for notification.

The procedure shown in FIG. 1b may be handled in different ways by the notification controller NC. The notification controller could be set to handle the request by priority for each application A1, A2, where the second application A2 has a higher priority and thereby is given priority over the second application given that only one notification was possible to be presented. A second possibility is that the notification controller NC has initiated an auction. The second application won the auction by offering the largest portion of the notification resources. This may also be combined with priority so that priority hierarchy is weighed into the decision by the notification controller NC regarding what application that will "win" the auction and that will be allowed to be presented to the user.

Figure 2A:
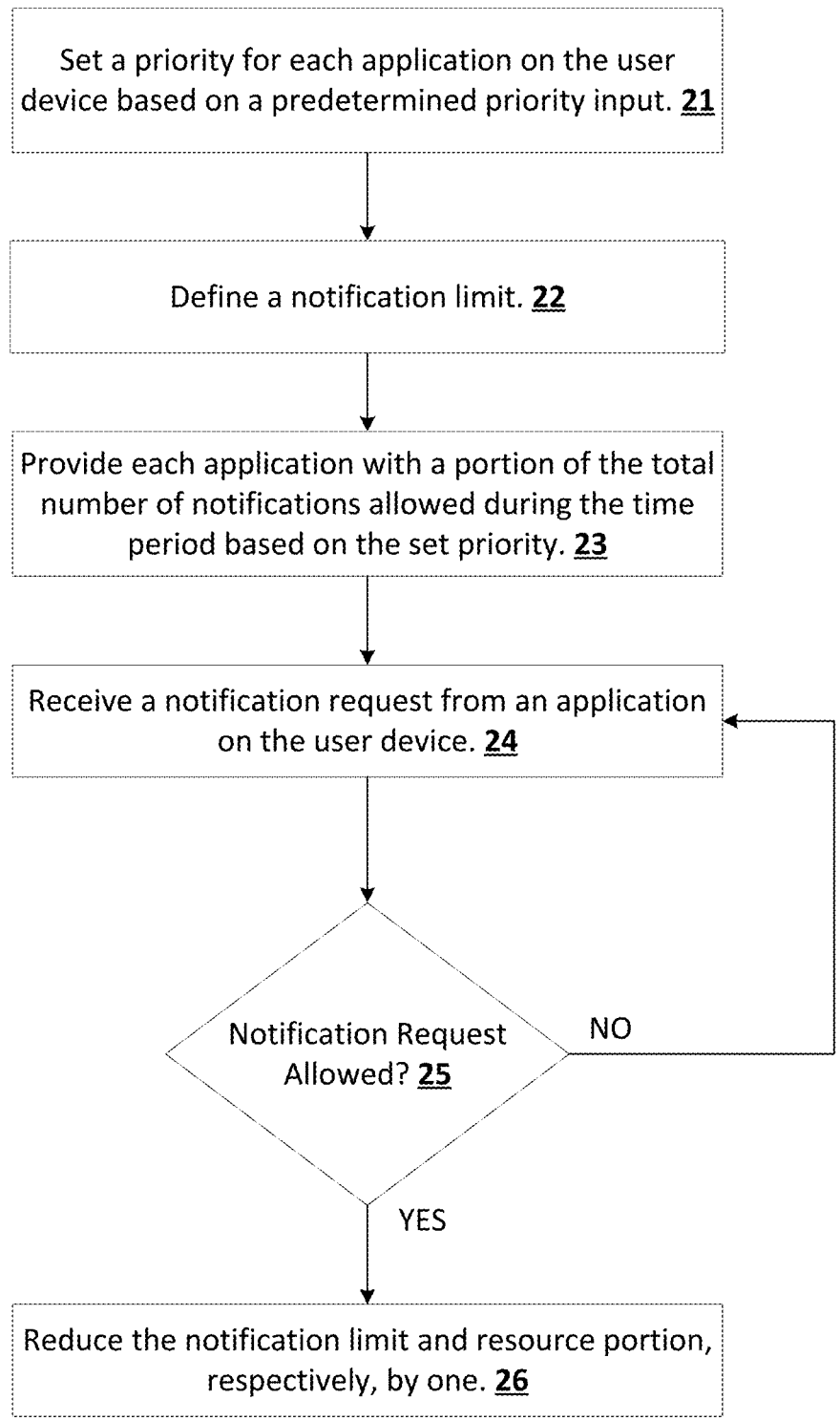
FIG. 2a is a block diagram describing the method for controlling notifications from applications on a user device.

FIG. 2a is a block diagram describing the method for controlling notifications from applications on a user device. The method comprises setting 21 a priority for each application on the user device based on a predetermined priority input, defining 22 a notification limit, wherein the notification limit defines a total number of notifications for presenting notifications allowed during a time period available to applications on the user device, and providing 23 each application with a portion of the total number of notifications allowed during the time period based on the set priority. The notification controller may then be receiving 24 a notification request from an application on the user device and may be allowing 25 the notification request if the resource portion and the notification limit, respectively, is larger than one. If the request was allowed the method will be reducing 26 the notification limit and resource portion, respectively, by one if the notification request is allowed. If the notification request is not allowed, the notification request is re-iterated to the receiving step 24.

Figure 2B:
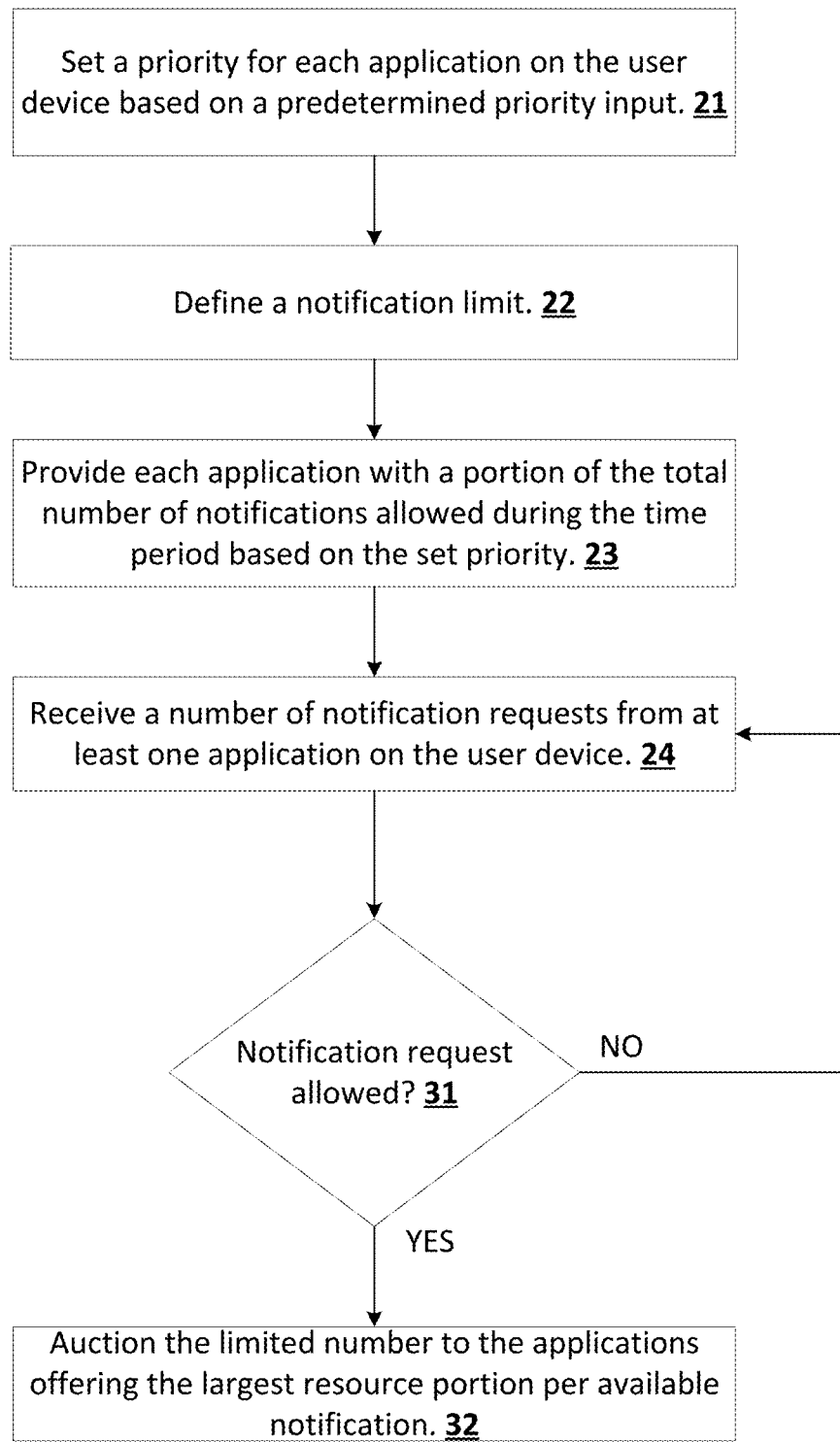
FIG. 2b is a block diagram describing the method for controlling notifications from applications on a user device where an auction mechanism is introduced.

FIG. 2b is a block diagram describing the method for controlling notifications from applications on a user device. The method comprises setting a priority 21 for each application on the user device based on a predetermined priority input, defining a notification limit 22, wherein the notification limit defines a total number of notifications for presenting notifications allowed during a time period available to applications on the user device, and providing 23 each application with a portion of the total number of notifications allowed during the time period based on the set priority. The method is then receiving 24 a number of notification requests from at least one application on the user device. If the number of notification requests exceeds the notification limit, the method is communicating 31 a reply to each request that a number of requested notifications exceeds the notification limit, It the number of requested notifications exceeded the notification limit the method will be auctioning 32 the limited number to the applications offering the largest resource portion per available notification. If the notification request is not allowed in the communicating step 31, the notification request may be re-iterated to the receiving step 24.

Figure 3:
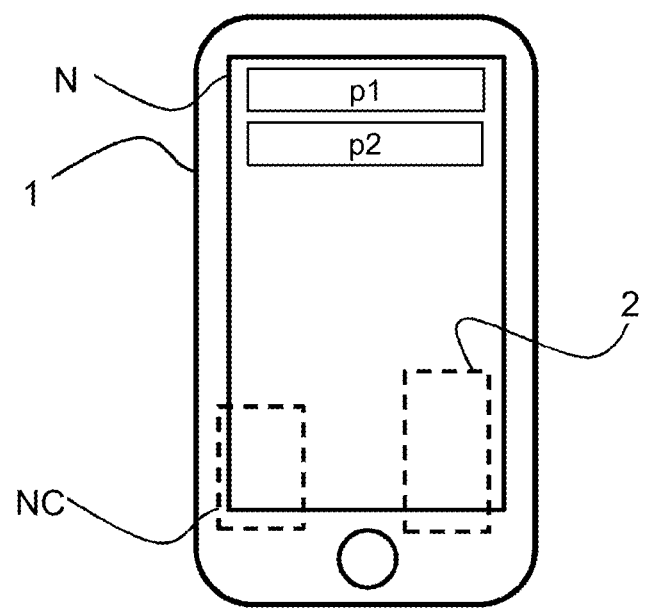
FIG. 3 is a schematic view of a user device comprising a computer program executing the described method for controlling notifications from applications on a user device.

FIG. 3 is a schematic view of a user device 1 comprising a computer program executing the described method for controlling notifications from applications on a user device. The computer program is stored on a computer readable storage medium or memory storage unit 2. The logic of the method is executed by the notification controller NC which is a processing unit capable of executing the method steps of the computer program stored on the computer readable storage medium or memory storage unit 2. Applications that get their notifications requests approved may present their notifications on the notifyer N, being a display of a mobile user device in FIG. 3.

By introducing a qonsecuence for notifying users, and a mechanism for deciding the right to notify, applications are forced to determine the value of notifying the users and whether it is worth it, resulting in the user only getting valuable notifications. The notifification controller distributes a total amount of notifications between the applications according to predetermined priority input based on a number of different priority input. The total amount of notifications may vary over time at different periods of time. The total amount may be user interface resources or cognitive resource. Resource is e.g. measured per time unit.

Resources are determined and quantified as a notification limit, wherein the notification limit defines a total number of notifications for presenting notifications allowed during a time period available to applications on the user device. This is an allocation of resources that thus may be handled in a way similar to how memory is allocated software driven devices. The decision regarding when to send notifications is distributed to the applications.

An important component of the presented method is increasing the signal to noise ratio for notifications by introducing a consequence for notifying. This in itself will force applications to set a value (for itself or it's publisher) to the notification and decide if it is worth the cost in available notification resource for the application. In case a real market place is introduced the cost could be translated into a monetary currency, but as previously explained, the cost does not have to be an actual monetary cost.

As each application is given a portion of available notifications per time period, an application that starts by rapidly displaying notifications may soon run out of its given portion so that it may not display any notifications until the next time period starts.

This simple mechanism has another great advantage. Different policies for both allocation as well as pricing may now be defined. One pricing policy can state different prices based on app category. For example, communication notifications could have a lower cost than others. The classification could be based on app store categories. Pricing policies can also be dynamic, defined by rules. One such pricing policy would be based on acceptable interruptability for the user. When the user is asleep at night or in a meeting, cost would be high.

The policies could be defined by the phone vendor or the user. Controlling notifications pricing could be done in a user interface similar to how you change audio volume for different types of notifications, i.e. much simpler than existing mechanisms.

The above mechanism is enough to make notification control both better and simpler and can easily be implemented in phones. It is possible to provide ways to balance allocation and pricing to get the desired level of notifications of the right kind. A notification limit is defined, wherein the notification limit defines a total number of notifications for presenting notifications allowed during a time period available to applications on the user device. Each application is then provided with a portion of the total number of notifications allowed during the time period based on its priority, which portion it may use to "pay" the costs for notifications. A market, where apps bid for the right to notify may then be introduced, for example within a certain time frame or with a certain priority. This will automatically balance pricing, and the user only have to control the scarcity of the notification resource. Default level will of course be set by the system, relieving the user even of this. This will be like lowering or raising the audio volume on the phone. One single slider or button can be used to increase or reduce number of notifications. If the cost is not only in terms of the given portion of the total number of notifications allowed during the time period but instead is actual currency it is possible for the phone vendor and user to take a share or charge a fee when the app pays for the notification. This market can be executed on the user device, as e.g. a phone or in the cloud.

The skilled person realizes that a number of modifications of the embodiments described herein are possible without departing from the scope of the invention, which is defined in the appended claims.

The invention claimed is:

1. Method for controlling notifications from applications on a user device, comprising:
    setting a priority for each application on the user device based on a predetermined priority input,
    defining a notification limit, wherein the notification limit defines a total number of notifications from all applications on the user device, for presenting notifications allowed during a time period available to the applications on the user device, and
    providing each application with a portion of the total number of notifications allowed during the time period based on the set priority.

2. The method according to claim 1, further comprising receiving a notification request from an application on the user device,
    allowing the notification request if the portion and the notification limit, respectively, is larger than one, reducing the notification limit and portion, respectively, by one if the notification request is allowed.

3. The method according to claim 1, further comprising receiving a number of notification requests from at least one application on the user device,
if the number of notification requests exceeds the notification limit,
communicating a reply to each request that a number of requested notifications exceeds the notification limit,
auctioning the limited number to the applications offering the largest resource portion per available notification.

4. The method according to claim 1, wherein the priority input and/or the notification limit is altered based on the time of day.

5. The method according to claim 1, wherein the priority input and/or the notification limit is modified by at least one setting made by a user of the user device, the operational system of the user device, a network operator of the user device.

6. The method according to claim 1, wherein a notification request is allowed regardless of remaining notification limit of notifications if the priority is set above a predetermined threshold.

7. The method according to claim 1, wherein a notification request is allowed regardless of remaining notification limit of notifications if the offered resource portion is above a predetermined threshold.

8. A non-transient computer readable medium comprising computer program code that, when executed by a processor, controls notifications from applications on a user device, including:
sets a priority for each application on the user device based on a predetermined priority input,
defines a notification limit, wherein the notification limit defines a total number of notifications from all application on the user device, for presenting notifications allowed during a time period available to the applications on the user device, and
provides each application with a portion of the total number of notifications allowed during the time period based on the set priority.

9. An electronic device, comprising:
a processor; and
a non-transient computer readable medium in the form of a memory that stores computer program code, wherein when the computer program code is executed by the processor, controls notifications from applications on the electronic device, including:
sets a priority for each application on the electronic device based on a predetermined priority input,
defines a notification limit, wherein the notification limit defines a total number of notifications from all applications on the electronic device, for presenting notifications allowed during a time period available to the applications on the electronic device, and
provides each application with a portion of the total number of notifications allowed during the time period based on the set priority.

10. The electronic device according to claim 9, wherein execution of the computer program code further causes the electronic device to:
receive a notification request from an application on the electronic device,
allows the notification request if the portion and the notification limit, respectively, is larger than one,
reduces the notification limit and portion, respectively, by one if the notification request is allowed.

11. The electronic device according to claim 9, wherein execution of the computer program code further causes the electronic device to:
receive a number of notification requests from at least one application on the electronic device,
if the number of notification requests exceeds the notification limit,
communicate a reply to each request that a number of requested notifications exceeds the notification limit,
auction the limited number to the applications offering the largest resource portion per available notification.

12. The electronic device according to claim 9, wherein the priority input and/or the notification limit is altered based on the time of day.

13. The electronic device according to claim 9, wherein the priority input and/or the notification limit is modified by at least one setting made by a user of the electronic device, the operational system of the electronic device, a network operator of the electronic device.

14. The electronic device according to claim 9, wherein the electronic device is a device comprised in the group of: a mobile phone, a tablet computer, a laptop, and a stationary computer.

15. The electronic device according to claim 9, wherein a notification request is allowed regardless of remaining notification limit of notifications if the priority is set above a predetermined threshold.

16. The electronic device according to claim 9, wherein a notification request is allowed regardless of remaining notification limit of notifications if the offered resource portion is above a predetermined threshold.

17. The method of claim 3, wherein the step of auctioning the limited number of notifications includes:
receiving payment of a currency from an application provider of an application of the at least one application; and
providing the application with a notification of the limited number of notifications based on receipt of the payment.

18. The electronic device of claim 11, wherein the electronic device is further configured to, as part of auctioning the limited number of notifications:
receive payment of a currency from an application provider of an application of the at least one application; and
provide the application with a notification of the limited number of notifications based on receipt of the payment.

* * * * *